(12) United States Patent
Schinner

(10) Patent No.: US 7,158,251 B2
(45) Date of Patent: Jan. 2, 2007

(54) DUPLICATE IMAGES FILES FOR IMPROVING IMAGE HANDLING AND TRANSMISSION

(75) Inventor: Charles Edward Schinner, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1149 days.

(21) Appl. No.: 10/081,692

(22) Filed: Feb. 22, 2002

(65) Prior Publication Data

US 2003/0161010 A1 Aug. 28, 2003

(51) Int. Cl.
*G06F 3/12* (2006.01)

(52) U.S. Cl. ............... 358/1.15; 358/450; 358/402; 358/474; 348/333.13; 348/372; 348/552

(58) Field of Classification Search ............... 358/1.15, 358/450, 474, 402; 348/207.2, 552, 333.01, 348/372, 333.13; 707/1
See application file for complete search history.

(56) References Cited

U.S. PATENT DOCUMENTS

| 5,440,401 A | 8/1995 | Parulski et al. ............. 358/342 |
| 5,940,117 A | 8/1999 | Hassan et al. ................ 348/13 |
| 5,949,551 A | 9/1999 | Miller et al. ................ 358/408 |
| 2002/0039202 A1* | 4/2002 | Hachiyama et al. ........ 358/450 |
| 2002/0093575 A1* | 7/2002 | Kusaka ........................ 348/233 |

* cited by examiner

*Primary Examiner*—Thomas D. Lee
*Assistant Examiner*—Heather D Gibbs

(57) ABSTRACT

An image capturing device includes an electronic image sensor, a processor, and a memory. The memory includes a full-size image storage storing one or more full-size digital images and a transfer image storage storing one or more corresponding transfer images. During an image capture, the image capturing device captures and stores a full-size image and also stores a transfer image that is a smaller version of the full-size image. The size of the transfer image is predetermined by the user.

32 Claims, 2 Drawing Sheets

DUPLICATE IMAGES FILES FOR IMPROVING IMAGE HANDLING AND TRANSMISSION

FIELD OF THE INVENTION

The present invention relates generally to digital imaging, and more particularly to handling and transmission of digital images created by an image capturing device.

BACKGROUND OF THE INVENTION

Digital cameras are electronic devices that capture digital images and save them to a digital memory. Multiple images may be captured and stored. The stored images may be later printed, copied, transferred, displayed, etc.

The size of captured images may vary, and image sizes depend heavily on the size of the image sensor in terms of the number of pixels it contains. The image sensor size typically ranges from 1.3 Megapixels (Mp) to 5 Mp. The higher the number of pixels, the higher the resolution of the captured image obtained by the sensor. The resulting image file is about 50 kilobytes to about 2 megabytes in size. A common image file size created by a 2 megabyte pixel image sensor is about 700 kilobytes. However, image files will undoubtedly grow larger as image sensor size grows. The image sensor size may grow in order to improve image resolution (i.e., as manufacturers produce image sensors made of more and more pixel sensor elements).

A digital camera user generally downloads captured images to a computer storage medium or transmits image files to a printer, and may print and/or store the images for subsequent use. Some advantages of digital images are that they may be transmitted electronically to others, may be used numerous times, and may be copied and modified. One transmission example is transmission of images via electronic mail (e-mail), wherein the user may wish to send photographs to geographically distant friends and relatives. E-mail transmission offers the advantages of being nearly instantaneous, low in cost, and relatively trouble free. The recipient may print, store, manipulate, or re-transmit a received digital image.

In the prior art, image transmission has typically comprised transmitting images as they are captured. The prior art approach is to e-mail or otherwise transmit an image as is.

The image transmission approach of the prior art has several drawbacks. The image transmission may be relatively slow if image files are large and may take significant time to transfer. The problem is not as acute for users who have high speed network access. However, many people are still using slow transmission methods, such as modems and phone lines. Over a 28.8 kilobaud phone line, a single image may take several minutes to transmit via e-mail.

An alternative prior art approach is to convert an image into a smaller image in order to facilitate transmission. One example is the conversion of a captured image into a thumbnail image. Thumbnail images are typically 140×120 pixels in size. However, thumbnails are too small for proper viewing and do not contain sufficient image detail. In addition, although a user may be able to use an available image processing software application to change the image size and resolution, many users do not have such image processing software or may not know how to use such software. Moreover, many users do not want to take the time to perform such an operation even if they are capable of doing so. Such processing may be too complex for most users. Most users just want to send an image and not bother with any additional steps.

Therefore, there remains a need in the art for improvement to image handling for purposes of image transmission.

SUMMARY OF THE INVENTION

An image capturing device comprises an electronic image sensor, a processor, and a memory. The memory includes a full-size image storage storing one or more full-size digital images and a transfer image storage storing one or more corresponding transfer images. During an image capture, the image capturing device captures and stores a full-size image and also stores a transfer image that is a smaller version of the full-size image.

DETAILED DESCRIPTION

Figure 1:
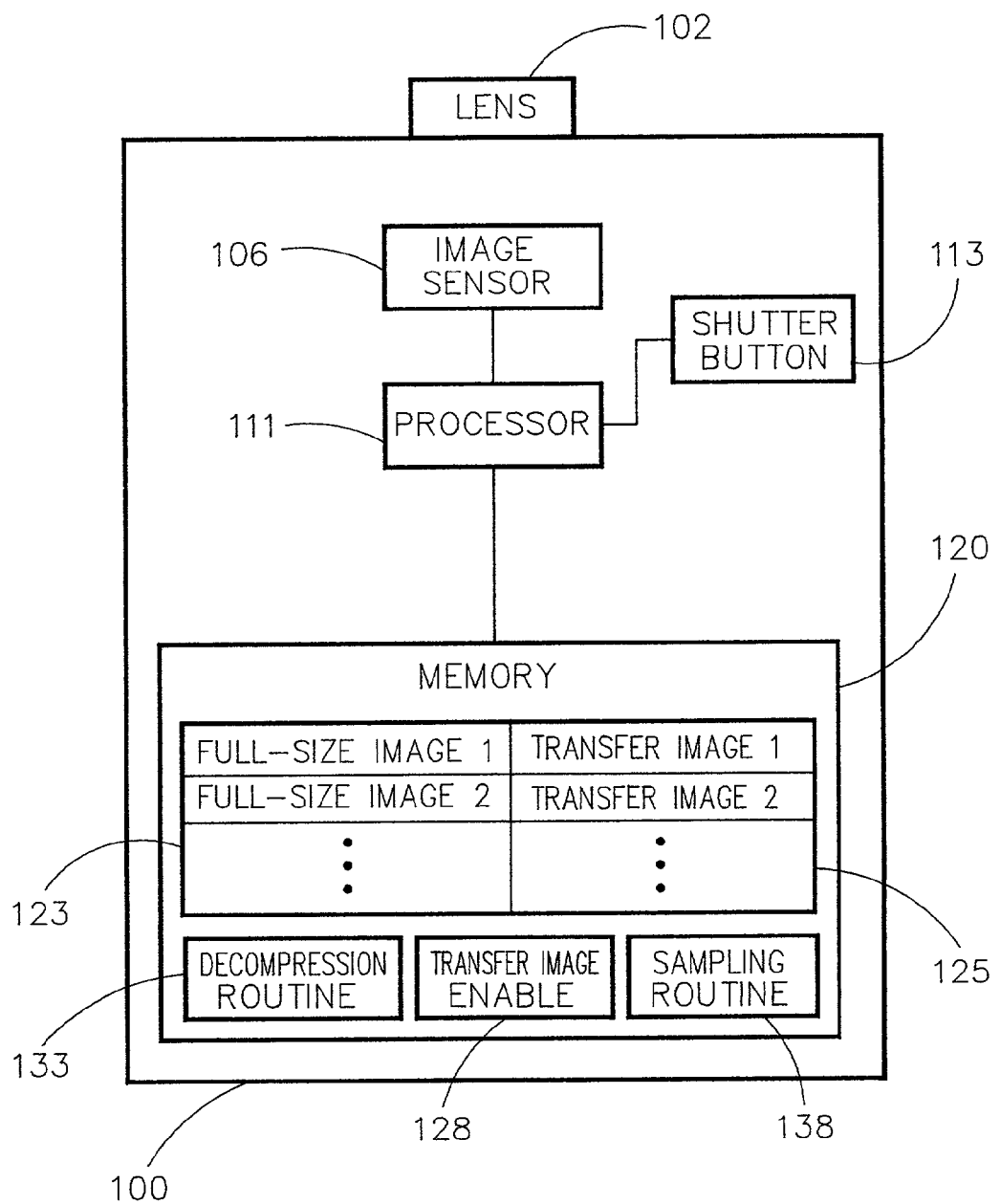
FIG. 1 is a schematic of an image capturing device according to one embodiment of the invention.

FIG. 1 is a schematic of an image capturing device 100 according to one embodiment of the invention. The image capturing device includes a lens 102, an electronic image sensor 106, a processor 111, a shutter button 113, and a memory 120.

The image sensor 106 may be any type of electronic image sensor capable of capturing images, such as a charge coupled device (CCD) sensor or a complementary metal oxide semiconductor (CMOS) sensor, for example.

The processor 111 may be any type of general purpose processor. The processor 111 executes a control routine contained in the memory 120. In addition, the processor 111 receives inputs and conducts image capturing operations.

The memory 120 may be any type of digital memory, including volatile and non-volatile digital memory. The memory 120 may include, among other things, a full-size image storage 123, a transfer image storage 125, and a transfer image enable variable 128. The memory 120 may also include a decompression routine 133, a sampling routine 138, a transfer image resolution setting 141, a transfer image compression setting 142, a transfer image size selection Table 1 146, and a transfer image size selection Table 2 148. In addition, the memory 120 may store software or firmware to be executed by the processor 111. It should be noted that although the memory 120 is shown as an internal memory, alternatively it may be any manner of removable memory medium, such as a memory card or disk, including flash memory cards or magnetic or optical disks.

The full-size image storage 123 stores full-size images captured by the image sensor 106. The size of images in the full-size image storage 123 is determined according to the image resolution setting and the image compression algorithm being used. The size of a full-size image may also depend on the image area and number of pixels of the electronic image sensor 106. The size of a non-compressed image file is typically determined by the number of pixels (i.e., the pixel height of the sensor multiplied by the pixel width), with the product being multiplied by three (due to the red, green and blue color planes).

The transfer image storage 125 stores files of transfer image size and typically stores transfer images corresponding to images in the full-size image storage 123. The size of a transfer image file may be settable by the user and is preferably 50 kilobytes or less in size. For example, the transfer images may be 160×120 pixels in size in order to comply with the Design Rule for Camera File System (DCF) standard. In addition, the transfer images may be highly compressed. A VGA resolution (i.e., 640×480) may be highly suitable for many applications, for example.

It should be understood that the full-size image storage 123 and the transfer image storage 125 may be in either a volatile or non-volatile memory. In one embodiment, a transfer image may be created in a volatile memory and stored in a non-volatile transfer image storage 125. The non-volatile transfer image storage 125 may comprise either an internal memory or a removable memory medium.

The name of a transfer image file may be closely related to or derived from the name of the corresponding full-size image. For example, the DCF filename format for an image is LLLLNNNN.jpg, where L=an alphanumeric character and N=a digit (0 to 9). An example of a full-size image filename could be IM001010.jpg. The associated transfer image filename may be SEND1010.jpg, for example. This may be desirable in order to associate the transfer image with the full-size image and to indicate that it is an image that is of reduced size for ease of transfer.

The transfer image enable variable 128 may be set to enable or disable by the user, and determines whether a transfer image is created and saved. This variable may be set through any manner of input devices, including via a button, switch, or user interface on the image capturing device 100.

The sampling routine 138 may be used to sample a full-size image in order to create a transfer image. The sampling routine 138 may perform a sampling according to the transfer image resolution setting 141.

The decompression routine 133 decompresses captured full-size images. The decompression may be done before sampling the full-size image. The decompression routine 133 may perform a decompression according to the transfer image compression setting 142. The transfer image resolution setting 141 and the transfer image compression setting 142 may be set according to a transfer image size selection.

Table 1 and Table 2 are optional tables that may be used to present a set of transfer image size choices to the user (see tables below and accompanying discussion). These tables may be factory programmed and may present predetermined transfer image sizes to the user. The transfer image sizes may be associated with transmission bandwidths or transmission modes, for example, in order to make selection easy for the user.

The transfer images may be used in any manner by the image capturing device 100 and the user. This may include displaying the transfer image as a way to judge whether to retain the full-size image, and may be used in order to judge whether to send the transfer image. Furthermore, the transfer image may be transmitted to another device or to another person, such as via e-mail or in a wireless transmission of any manner. For example, the transfer image may be used for transmission to a recipient and the recipient may then request transmission of the corresponding full-size image. Moreover, the transfer image may be displayed in order for the user to judge whether to send the corresponding full-size image. In addition, the transfer image may be used for website images. One use may be for auction websites. EBAY, for example, prefers images less than 50 kilobytes in size.

In one embodiment, the user of the image capturing device 100 must select the size of the transfer image. Alternatively, in another embodiment, the transfer image size may be factory set to a default size and the user may modify this default setting. This embodiment may be preferred by persons who do not want to expend unnecessary time and effort configuring the image capturing device 100.

Figure 2:
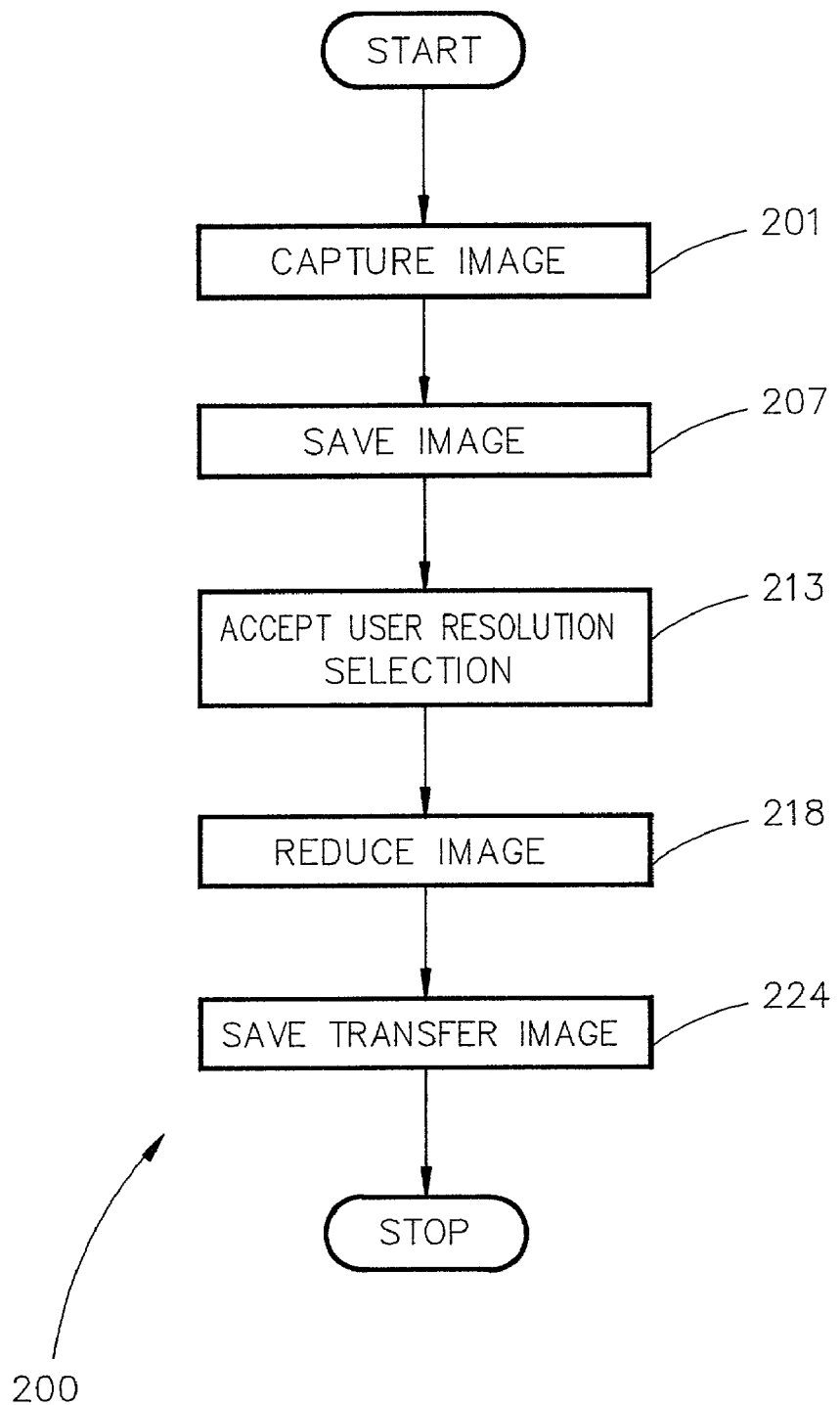
FIG. 2 is a flowchart of an image capturing method according to another embodiment of the invention.

FIG. 2 is a flowchart 200 of an image capturing method according to another embodiment of the invention. In step 201, a full-size image is captured. The actual size of the image in bytes may depend on the image resolution setting, the number of pixels in the image sensor, and the image compression algorithm being used. The full-size image may be compressed for storage.

In step 207, the full-size image is saved to the digital memory 120. The memory 120 may be an internal memory of the image capturing device 100 or may be any manner of removable memory medium.

In step 210, the image capturing device 100 determines whether it is in a transfer image creation mode. This may be done by checking the state of the transfer image enable variable 128. In the transfer image creation mode (i.e., the transfer image enable variable 128 is set to an enable state), the image capturing device 100 creates a transfer image that is a reduced full-size image. If the image capturing device 100 is in a transfer image mode, the method proceeds to step 213; otherwise it exits.

The transfer image enable variable 128 may be set to an enable state before an image capture commences, and all subsequently captured images are saved as full-size images and as transfer images. Alternatively, the user may capture an image, enter a review mode that selects a particular full-size image, and then may press a transfer image button or select a transfer image menu entry in order to instantly create a transfer image from the particular full-size image. The user therefore does not have to first transfer the full-size image to another device before being able to create a smaller image, but can advantageously create a transfer image onboard the image capturing device 100.

In step 213, the image capturing device accepts a user input that selects a size or resolution of the transfer image. The accepting may include retrieving a stored transfer image enable setting or receiving a button or switch input by the user. Size refers to the number of data bytes in the file, while resolution refers to the pixel width and the pixel height of the image in terms of the number of pixels. For purposes of clarity, the discussion will refer only to size when referring to a transfer image. This step may occur before or after the image capture of step 201. The size of the transfer image may be determined in various ways. The user may select a transfer image size. It should be understood that if the user does not make an explicit selection, the user implicitly selects a default transfer image size.

In one embodiment, the image capturing device 100 may display a predetermined set of transfer image sizes. The user therefore may select from the listing. Alternatively, the listing may comprise a set of transmission speeds and durations, and the image capturing device 100 may automatically set the transfer image size (i.e., the resolution and compression) corresponding to the user's selection.

In another embodiment, the user may input a desired transmission duration and a known transmission speed, and the image capturing device 100 may automatically compute the transfer image size. This may be a feature of a "share intent" mode of the image capturing device 100, where the user has indicated a desire to transmit an image.

Table 1 below shows a transmission bandwidth table of yet another embodiment, wherein the table may be used to select the size of the transfer image. Table 1 may be visually presented to the user, who indirectly chooses a transfer image size by choosing a transmission bandwidth. The user may input the transmission bandwidth, and the image capturing device 100 may look up the corresponding transfer file size from Table 1.

TABLE 1

| Transmission Bandwidth | Image Resolution |
|---|---|
| 28.8 Kb | 160 × 120 |
| 56.0 Kb | 320 × 240 |
| 120 Kb | 640 × 480 |
| 1.2 Mb | 1280 × 960 |
| 12 Mb | 2560 × 1920 |
| 120 Mb | 5320 × 3840 |

Table 2 below shows a transmission mode table of yet another embodiment. Table 2 may be visually presented to the user, who indirectly chooses a transfer image size by choosing a transmission mode. The transmission mode may be a device the user is transmitting an image to, or may be a type of communications link to be used. When the user inputs a transmission mode, the image capturing device 100 may look up the corresponding transfer file size from Table 2.

TABLE 2

| Transmission mode | Image Resolution |
|---|---|
| Cell phone (slowest) | 160 × 120 |
| Phone modem | 320 × 240 |
| PDA/wireless | 640 × 480 |
| DSL | 2560 × 3840 |
| Cable modem (fastest) | 5120 × 3840 |

It should be understood that Tables 1 and 2 may additionally include a compression factor, wherein selection of a desired transmission characteristic also results in a selection of a predetermined compression factor. The predetermined compression factor may be chosen to accommodate the desired image resolution and transmission characteristic, such as bandwidth or mode. Alternatively, the image capturing device 100 may automatically calculate a corresponding compression factor when a table entry is chosen by the user.

In yet another alternative embodiment, the image capturing device 100 may detect a transmission link, such as an IR link, for example. Consequently, the image capturing device 100 may then lookup a transfer image size from Table 1 or Table 2. This embodiment requires the least user knowledge and the least user input.

In yet another alternative embodiment, the transfer image size may be calculated by an adaptive algorithm. The calculation may assume that the transmission bandwidth is essentially linear with respect to the image size. First, a compression factor may be calculated. The compression factor C is:

$$C=[(\text{size of full-size image})(\text{duration})(\text{Bps})]/\text{speed} \quad (1)$$

Where Bps=11 bits/character. The image capturing device 100 may select or assume a default value for either the transmission duration (such as a 10 second default transmission duration, for example) or for the transmission speed. Then the transfer image size S may be determined using the relationship:

$$S=(\text{size of full-size image})/(\text{compression factor}) \quad (2)$$

In step 218, the full-size image is reduced to generate a transfer image. This may be done through any manner or combination of sampling, image compression, etc. In one embodiment, the generation of the transfer image may include the steps of decompressing the full-size image and sampling the full-size image down to a desired size. Compression of the transfer image may then be performed. In an additional step, the image capturing device 100 may automatically create a name for the small file that is closely related to or derived from the name of the full-sized file, as previously discussed.

In step 224, the transfer image is saved to memory. The memory may be the same memory storing the full-size images, or alternatively may be a different memory.

In an additional step, the user may enable and disable the creation and storing of a transfer image. This may be done through any manner of user input device or user interface on the image capturing device 100. When the small file feature is enabled, a small file may be automatically created by the image capturing device 100 upon occurrence of an image capture.

The duplicate image files may apply to any digital still cameras or any video cameras that capture still digital images. The duplicate transfer images may be used for many purposes. They may be used for transmission of images. They may be used for web sites. They may even be used for a camera display (i.e., an LCD screen on the back of the camera) without need for decompression and resolution change of the full-size image. This may be advantageous if the transfer image matches the resolution of the camera display (a 640×480 pixel display is commonly used).

The invention differs from the prior art in that according to the invention a duplicate transfer image is automatically generated during image capture. The transfer image may be based on predetermined criteria, such as transmission bandwidth, user preferences, etc, Moreover, the invention differs from the prior art in that the invention creates and stores both a full-size image and a corresponding transfer image in separate but associated files. Therefore, there is no need to later create a duplicate smaller file when transmission of the image is desired.

The duplicate image files according to the invention provide several benefits. The user may automatically have a transfer image for the purposes of quickly viewing the captured image. The user may automatically have a transfer image for the purpose of putting an image into a website or other image display. Most beneficially, the user may automatically have a transfer image file for efficiently and economically transmitting an image to another device or person. This enables a user to quickly and efficiently transmit the image without having to perform any manner of additional processing.

I claim:

1. An image capturing device, comprising:
   an electronic image sensor;
   a processor capable of communicating with said image sensor; and
   a memory capable of communicating with said processor and including a full-size image storage area capable of storing a full-size digital image and a transfer image storage area capable of storing a corresponding transfer image;
   said memory further comprising a transmission bandwidth table including one or more transmission bandwidth entries and corresponding transfer image sizes, wherein a transmission bandwidth input selects a corresponding transfer image size from said transmission bandwidth table;

wherein during an image capture said image capturing device captures and stores a full-size image in said full-size image storage area and also stores in said transfer image storage area a transfer image that is a smaller version of said full-size image.

2. The device of claim 1, said memory further comprising a user-settable transfer image enable variable that controls whether a transfer image is created and saved.

3. The device of claim 1, wherein said transfer image storage area further comprises a transfer image filename storage.

4. The device of claim 1, said memory further comprising:
a decompression routine; and
a sampling routine;
wherein said image capturing device decompresses said full-size image and samples said full-size image in order to create said transfer image.

5. An image capturing device, comprising:
an electronic image sensor;
a processor capable of communicating with said image sensor; and
a memory capable of communicating with said processor and including a full-size image storage area storing a full-size digital image and a transfer image storage area storing a corresponding transfer image;
said memory further comprising a transmission mode table including one or more transmission mode entries and corresponding transfer image sizes, wherein a transmission mode input selects a corresponding transfer image size from said transmission mode table;
wherein during an image capture said image capturing device captures and stores a full-size image in said full-size image storage area and also stores in said transfer image storage area a transfer image that is a smaller version of said full-size image.

6. The device of claim 5, said memory further comprising a user-settable transfer image enable variable that controls whether a transfer image is created and saved.

7. The device of claim 5, wherein said transfer image storage area further comprises a transfer image filename storage.

8. The device of claim 5, said memory further comprising:
a decompression routine; and
a sampling routine;
wherein said image capturing device decompresses said full-size image and samples said full-size image in order to create said transfer image.

9. An image capturing method, comprising the steps of:
capturing a digital image;
storing said digital image as a full-size image;
determining a transfer image size according to a predetermined user input;
generating a transfer image from said full-size image according to said determined transfer image size;
storing said transfer image; and
accepting a user input that enables or disables the steps of generating and storing said transfer image;
with the accepting step further comprising the steps of:
presenting a predetermined set of transmission durations and speeds to a user;
accepting a user input of a particular transmission duration and speed from said predetermined set of transmission times and speeds, with said particular transmission time and speed choosing a predetermined corresponding transfer image size.

10. The method of claim 9, wherein the generating step further comprises the steps of:
decompressing said full-size image; and
sampling said full-size image down to said transfer image.

11. The method of claim 9, further comprising the step of generating a derivative filename for said transfer image.

12. An image capturing method, comprising the steps of;
capturing a digital image;
storing said digital image as a full-size image;
determining a transfer image size according to a predetermined user input;
generating a transfer image from said full-size image according to said determined transfer image size;
storing said transfer image; and
accepting a user input that enables or disables the steps of generating and storing said transfer image;
with the accepting step further comprising the steps of:
accepting a user input of a particular transmission bandwidth from a transmission bandwidth table; and
looking up a corresponding transfer image size from said transmission bandwidth table.

13. The method of claim 12, wherein the generating step further comprises the steps of;
decompressing said full-size image; and
sampling said full-size image down to said transfer image.

14. The method of claim 12, further comprising the step of generating a derivative filename for said transfer image.

15. An image capturing method, comprising the steps of:
capturing a digital image;
storing said digital image as a full-size image;
determining a transfer image size according to a predetermined user input;
generating a transfer image from said full-size image according to said determined transfer image size;
storing said transfer image; and
accepting a user input that enables or disables the the steps of generating and storing said transfer image;
with the accepting step further comprising the steps of:
accepting a user input of a particular transmission mode from a transmission mode table; and
looking up a corresponding transfer image size from said transmission mode table.

16. The method of claim 15, wherein the generating step further comprises the steps of:
decompressing said full-size image; and
sampling said full-size image down to said transfer image.

17. The method of claim 15, further comprising the step of generating a derivative filename for said transfer image.

18. An image capturing method, comprising the steps of:
capturing a digital image;
storing said digital image as a full-size image;
determining a transfer image size according to a predetermined user input;
generating a transfer image from said full-size image according to said determined transfer image size;
storing said transfer image; and
accepting a user input that enables or disables the steps of generating and storing said transfer image;
with the accepting step further comprising the steps of:
accepting a user input of a transmission speed;
accepting a user input of a transmission duration; and
calculating a transfer image size from said transmission speed, said transmission duration, a bits per character multiplication constant, a compression factor, and a size of said full-size image.

19. The method of claim 18, wherein the generating step further comprises the steps of:
  decompressing said full-size image; and
  sampling said full-size image down to said transfer image.

20. The method of claim 18, further comprising the step of generating a derivative filename for said transfer image.

21. An image capturing method, comprising the steps of:
  capturing a digital image;
  storing said digital image as a foil-size image.
  recalling a transfer image size;
  automatically reducing said frill-size image according to said transfer image size to create a transfer image;
  storing said transfer image; and
  accepting a user input that enables or disables the steps of reducing and storing said transfer image;
  with the recalling step further comprising the steps of:
  presenting a predetermined set of transmission times and speeds to a user;
  accepting a user input of a particular transmission time and speed from said predetermined set of transmission times and speeds, with said particular transmission time and speed choosing a corresponding transfer image size.

22. The method of claim 21, wherein the reducing step further comprises the steps of:
  decompressing said full-size image; and
  sampling said full-size image down to said transfer image.

23. The method of claim 21, further comprising the step of generating a derivative filename for said transfer image.

24. An image capturing method, comprising the steps of:
  capturing a digital image;
  storing said digital image as a full-size image;
  recalling a transfer image size;
  automatically reducing said full-size image according to said transfer image size to create a transfer image;
  storing said transfer image; and
  accepting a user input that enables or disables the steps of reducing and storing said transfer image;
  with the recalling step further comprising the steps of:
  accepting a user input of a particular transmission bandwidth from a transmission bandwidth table; and
  looking up a corresponding transfer image size from said transmission bandwidth table.

25. The method of claim 24, wherein the reducing step further comprises the steps of:
  decompressing said full-size image; and
  sampling said full-size image down to said transfer image.

26. The method of claim 24, further comprising the step of generating a derivative filename for said transfer image.

27. An image capturing method, comprising the steps of:
  capturing a digital image;
  storing said digital image as a full-size image;
  recalling a transfer image size;
  automatically reducing said full-size image according to said transfer image size to create a transfer image;
  storing said transfer image; and
  accepting a user input that enables or disables the steps of reducing and storing said transfer image;
  with the recalling step further comprising the steps of:
  accepting a user input of a particular transmission mode from a transmission mode table; and
  looking up a corresponding transfer image size from said transmission mode table.

28. The method of claim 27, wherein the reducing step further comprises the steps of:
  decompressing said full-size image; and
  sampling said full-size image down to said transfer image.

29. The method of claim 27, further comprising the step of generating a derivative filename for said transfer image.

30. An image capturing method, comprising the steps of:
  capturing a digital image;
  storing said digital image as a full-size image;
  recalling a transfer image size;
  automatically reducing said full-size image according to said transfer image size to create a transfer image;
  storing said transfer image; and
  accepting a user input that enables or disables the steps of reducing and storing said transfer image;
  with the recalling step further comprising the steps of:
  accepting a user input of a transmission speed;
  accepting a user input of a transmission duration;
  calculating a transfer image size from said transmission speed, said transmission duration, a bits per character multiplication constant, a compression factor, and a size of said full-size image.

31. The method of claim 30, wherein the reducing step further comprises the steps of:
  decompressing said full-size image; and
  sampling said full-size image down to said transfer image.

32. The method of claim 30, further comprising the step of generating a derivative filename for said transfer image.

* * * * *

UNITED STATES PATENT AND TRADEMARK OFFICE
CERTIFICATE OF CORRECTION

PATENT NO. : 7,158,251 B2 Page 1 of 1
APPLICATION NO. : 10/081692
DATED : January 2, 2007
INVENTOR(S) : Charles Edward Schinner It is certified that error appears in the above-identified patent and that said Letters Patent is hereby corrected as shown below:

On the face page, in field (54), in column 1, in "Title", line 1, delete "IMAGES" and insert -- IMAGE --, therefor.

In column 1, line 1, delete "IMAGES" and insert -- IMAGE --, therefor.

In column 8, line 9, in Claim 12, delete "of;" and insert -- of: --, therefor.

In column 8, line 25, in Claim 13, delete "of;" and insert -- of: --, therefor.

In column 8, line 38, in Claim 15, after "disables the" delete "the".

In column 9, line 9, in Claim 21, delete "foil-size image." and insert -- full-size image; --, therefor.

In column 9, line 11, in Claim 21, delete "frill-size" and insert -- full-size --, therefor.

Signed and Sealed this

Fifth Day of May, 2009

JOHN DOLL
*Acting Director of the United States Patent and Trademark Office*